United States Patent [19]

DiCenzo

[11] Patent Number: 4,680,732
[45] Date of Patent: Jul. 14, 1987

[54] INTERFACE CIRCUIT FOR CONNECTING PERIPHERAL EQUIPMENT TO A COMPUTER TERMINAL

[75] Inventor: Daniel A. DiCenzo, Bellbrook, Ohio

[73] Assignee: NCR Corporation, Dayton, Ohio

[21] Appl. No.: 401,441

[22] Filed: Jul. 23, 1982

[51] Int. Cl.[4] .......................................... G06F 13/12
[52] U.S. Cl. ................................................ 364/900
[58] Field of Search .................. 377/73, 81, 44, 52, 377/108; 364/200 MS File, 900 MS File

[56] References Cited

U.S. PATENT DOCUMENTS

| | | | |
|---|---|---|---|
| 4,079,448 | 3/1978 | N'Guyen et al. | 364/200 |
| 4,115,852 | 9/1978 | Rozell | 364/200 |
| 4,124,888 | 11/1978 | Washburn | 364/200 |
| 4,156,796 | 5/1979 | O'Neal et al. | 364/900 X |
| 4,408,272 | 10/1983 | Walters | 364/200 |

OTHER PUBLICATIONS

MC68120/MC608121, Intelligent Peripheral Controller User's Manual, 1981, pp. 1—1 through 1-12.

*Primary Examiner*—Thomas M. Heckler
*Attorney, Agent, or Firm*—J. T. Cavender; Casimer K. Salys

[57] ABSTRACT

An electronic interface controller for coupling peripheral equipment, such as a keyboard, printer, or magnetic stripe reader, through a financial terminal to a financial computer system. The interface controller selects the peripheral equipment to be utilized, prescribes the operating mode, and establishes the timing and synchronization of the data transfer. Among its features the invention also includes a unique implementation of D-type flip-flops, with logic feedback, to create synchronous binary counters of selectable modulos.

7 Claims, 14 Drawing Figures

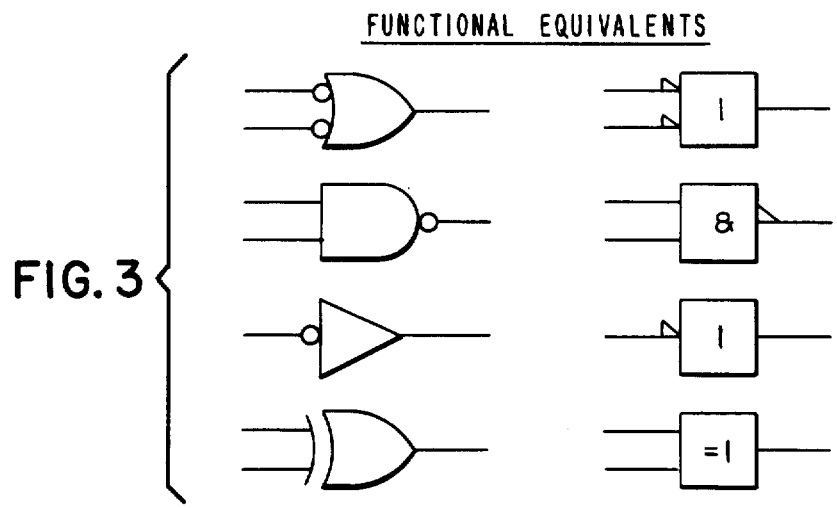
FIG. 3 FUNCTIONAL EQUIVALENTS
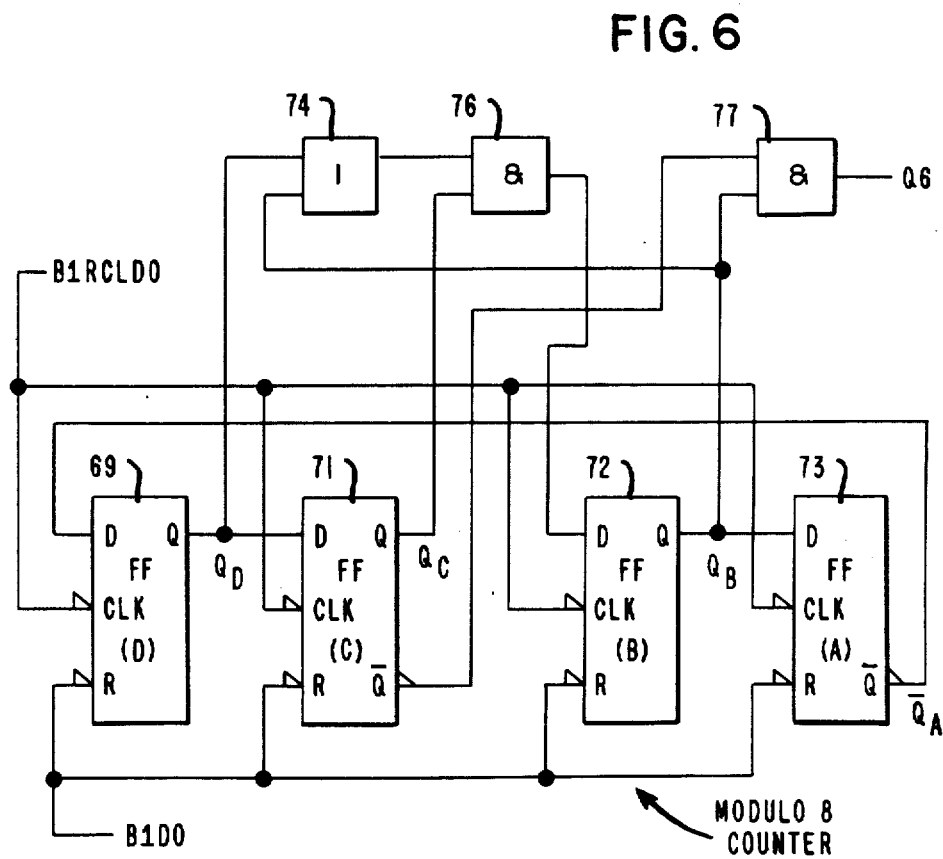
FIG. 6

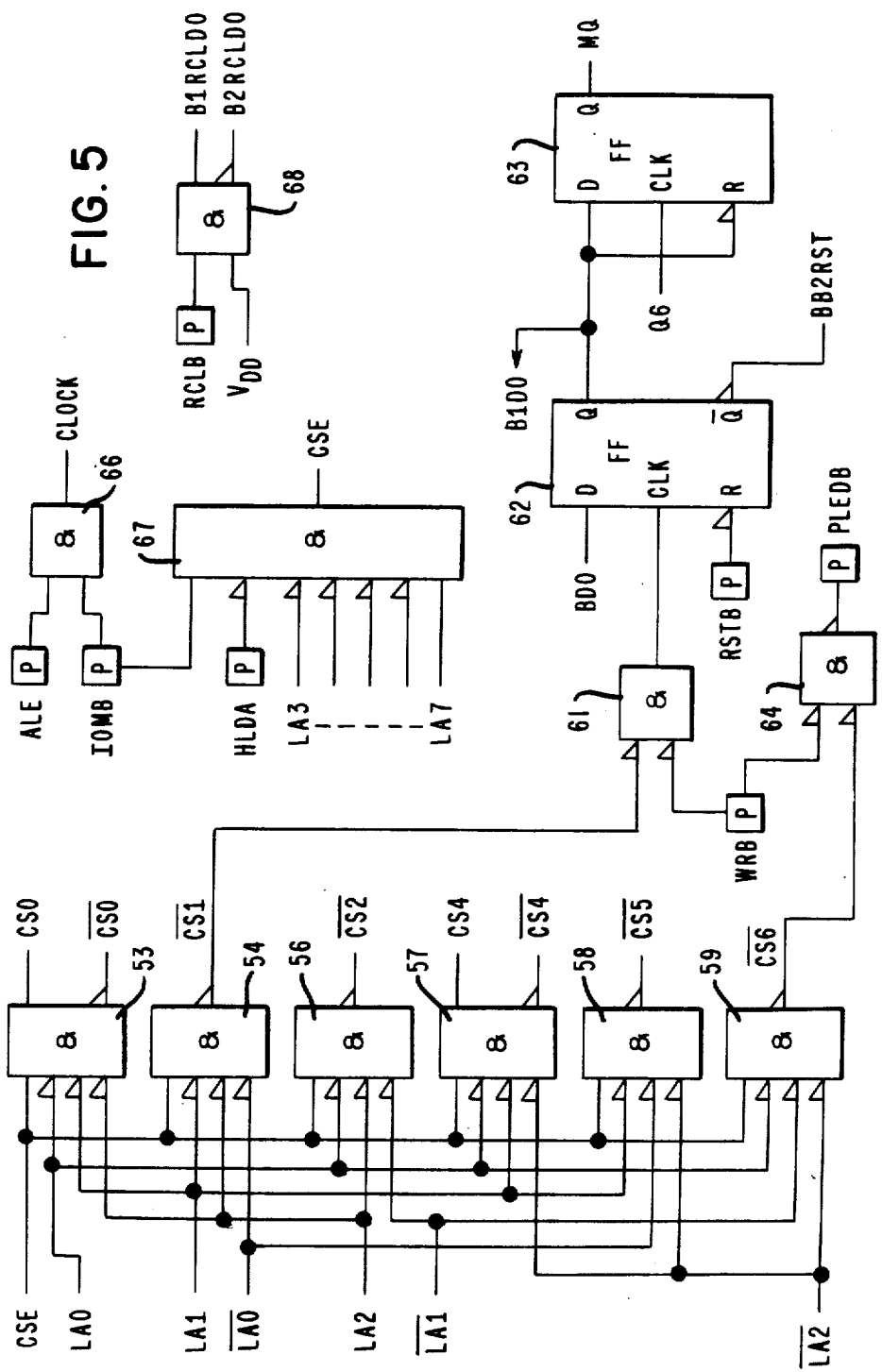

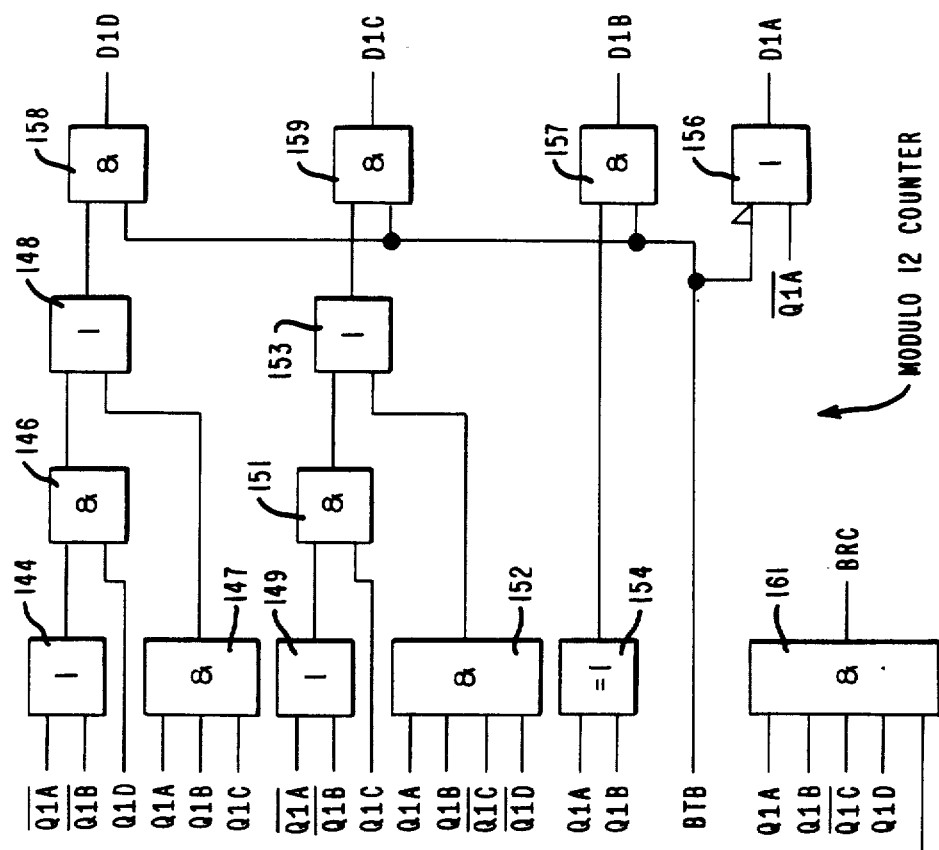
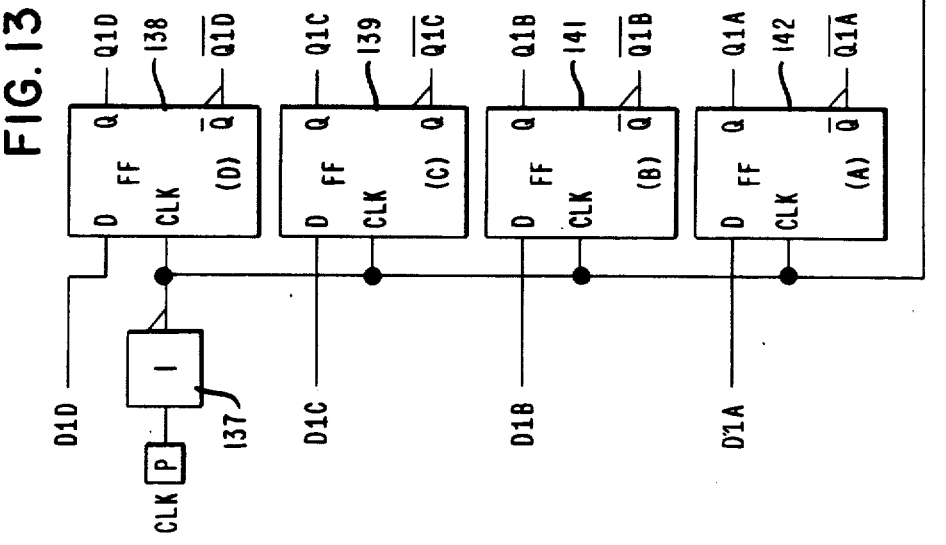
FIG. 13

INTERFACE CIRCUIT FOR CONNECTING PERIPHERAL EQUIPMENT TO A COMPUTER TERMINAL

BRIEF SUMMARY

The present invention relates to an electronic interface controller configured to connect a number of functionally distinct pieces of peripheral equipment to a financial terminal. A typical configuration of peripheral equipment includes a keyboard, a magnetic stripe reader and a printer, though other reading and visually perceivable output means are contemplated additions. As embodied, the interface controller selects the peripheral equipment, prescribes the operating mode, and establishes the timing and synchronism which regulates the transfer of data between the terminal and the selected piece of equipment. The embodying interface controller also incorporates a section of random access memory (RAM) and a section of read only memory (ROM); the former for temporary data storage and the latter for expanding the financial terminal control logic to handle the peripheral equipment.

One unique aspect of the invention resides in a novel counter circuit which exhibits operational features particularly suited for dividing frequencies in synchronously operated circuits. The various embodiments of the counter circuit are characterized by their use of D-type flip-flops (FFs) in combination with steering logic in multiple feedback loops to cause the division of the clock frequency according to the design modulo. The utilization of D-type FFs with feedback ensures synchronism in the start and stop operation, appropriate sequencing of the count, and the absence of race conditions and timing skews. This combination of structural and operational features is particularly valuable in the context of integrated circuits, where each D-type FF consumes a relatively small amount of chip area when compared to the J-K type FFs conventionally used to implement counting circuits.

These and the other novel features which are inherent in the interface controller and counter circuits will be understood upon considering the ensuing description of the preferred embodiment.

BRIEF DESCRIPTION OF THE DRAWINGS

FIG. 3 is a legend relating functional equivalents.

FIGS. 4, 5, 7, 9, 10 and 11 are schematic block diagrams of various sections in the embodying interface circuit.

FIGS. 6, 13 and 14 contain schematic block diagrams of counters utilized in the embodying interface circuit.

DETAILED DESCRIPTION

The connection of multiple financial terminals directly to a single financial computer is a widely-recognized approach to providing the terminal operator, for instance a bank teller, with access to the stored data and the computational capabilities of the computer. With the trend toward greater automation in transactions between financial institutions and their customers, there is a growing recognition that future financial systems will include some form of direct customer access to limited features of the computer system through distinct peripheral equipment functionally different from the financial terminal. In such a case, the financial terminal would be retained as an intermediate control, to selectively designate the peripheral equipment and to regulate the content of the data transferred to and from the financial computer.

One aspect of the invention relates to an interface controller by which various pieces of peripheral equipment are coupled to a financial terminal. Another aspect relates to unique configurations of counting circuits.

Figure 1:
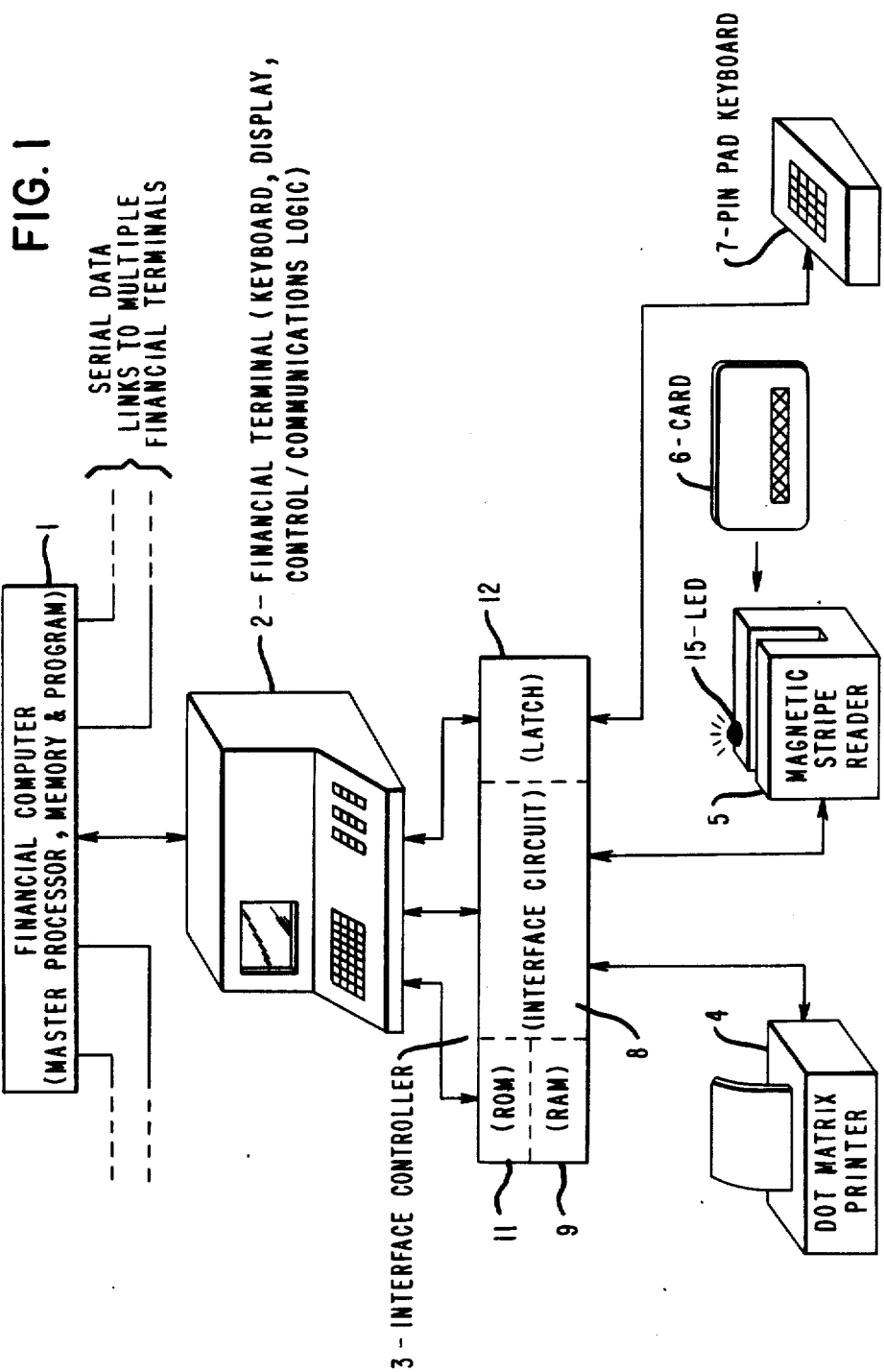
FIG. 1 schematically illustrates the structural relationship of the interface controller to the composite financial system.

To understand the composite invention as presently embodied, consider the generalized financial system depicted in FIG. 1 of the drawings, in the context of a banking system. The peripheral equipment is first selectively enabled by a teller, using Financial Terminal 2. The customer then identifies himself and his account with a magnetically-coded Credit Card, 6, by moving the card through Magnetic Stripe Reader 5. Thereafter, the customer makes his request known using Pin Pad Keyboard 7 and receives a copy of the complete transaction in the form generated by Dot Matrix Printer 4. From the arrangement of the equipment shown in FIG. 1, it is clear that Interface Controller 3 not only selects and regulates the peripheral equipment, but provides a path for bidirectional transfer of instructions and data between Financial Terminal 2 and the attached pieces of peripheral equipment. As shown generally in FIG. 1, Financial Terminal 2 is merely one of multiple financial terminals connected to Financial Computer 1.

Interface Controller 3, as presently embodied, is comprised of four individual sections: Interface Circuit 8, RAM 9, ROM 11 and Latch 12. ROM section 11 expands the addressable instruction set for the controller to accommodate the peripheral equipment, while RAM section 9 serves as temporary storage for Magnetic Stripe Reader 5 data when Financial Terminal 2 is occupied with other functions. Latch 12 holds the binary coded data sent from Financial Terminal 2 to Pin Pad Keyboard 7 in the course of determining which keys are depressed. Though shown as a separate entity, a preferable configuration would integrate RAM 9, ROM 11, Latch 12 and Interface Circuit 8 into a single unit when all three pieces of peripheral equipment, 4, 5 and 7, are contemplated for the overall system.

The ensuing analysis of Interface Circuit 8 will commence with a functional overview. Thereafter, the operations of RAM section 9, ROM section 11 and Latch section 12 will be described individually. The unique counter circuits noted previously will be developed in conjunction with the concluding description of the structural circuits which constitute Interface Circuit 8.

Figure 2:
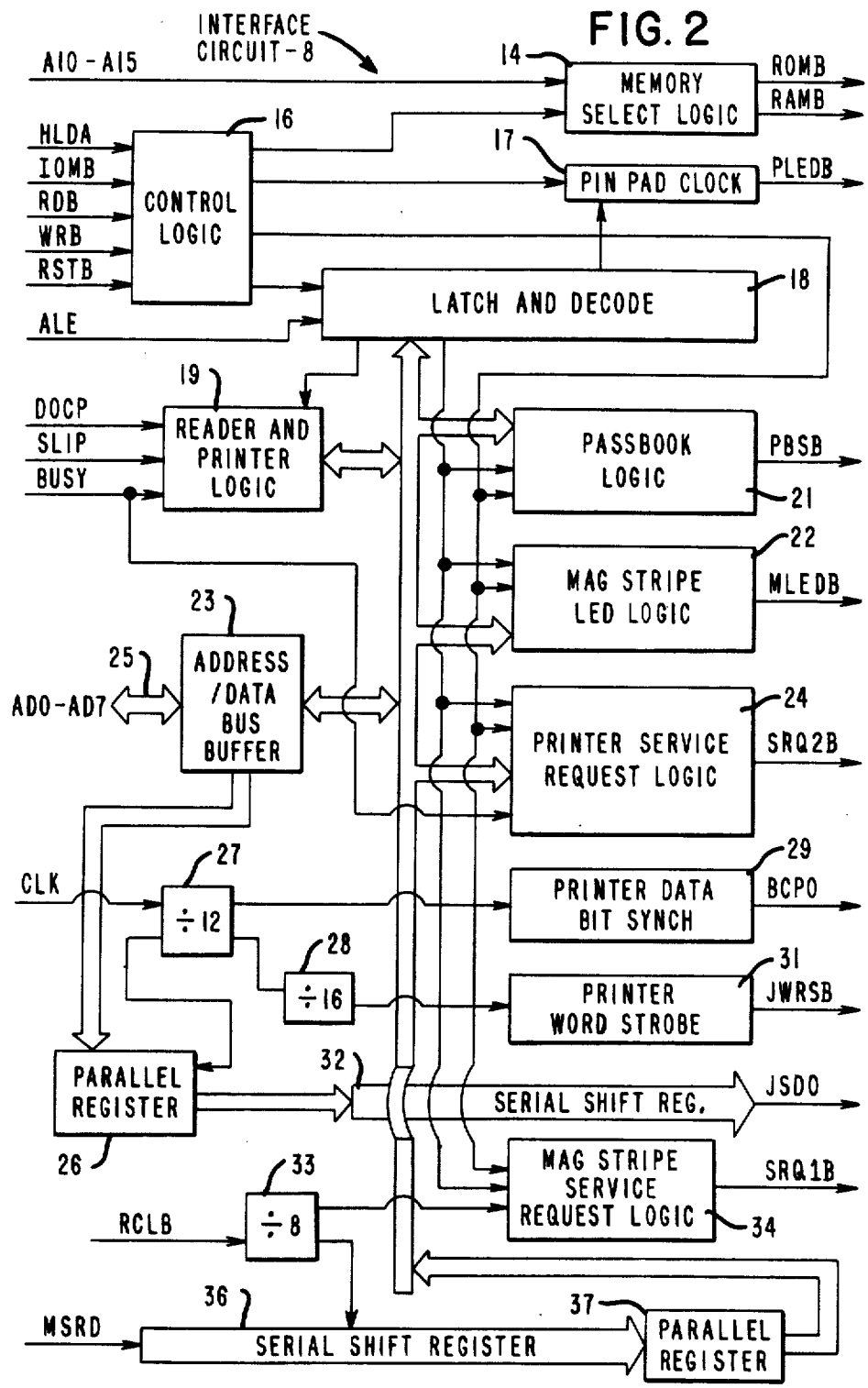
FIG. 2 is a functional block diagram of the interface circuit.

The functional block diagram of Interface Circuit 8 is depicted in FIG. 2 of the drawings. The direction of data flow, input (I) or output (0), is represented by the arrowhead orientation on the signal flow lines. Any line may actually represent multiple electrical paths. The line symbols, the direction of data flow, and functional summaries of the lines, are presented in Table I, below.

TABLE I

| Symbol | Direction | Function |
|---|---|---|
| AD0–AD7 | I/O | Address/data bus |
| A10–A15 | I | Memory address bus |
| CLK | I | Clock from financial terminal. |

TABLE I-continued

| Symbol | Direction | Function |
|---|---|---|
| RSTB | I | Reset signal from terminal, e.g. at power up |
| HLDA | I | Priority hold command to disable interface |
| ALE | I | Demux command signal to separate address and data signals on AD0-AD7 |
| RCLB | I | Clock signal gen. by magnetic stripe reader |
| MSRD | I | Data from magnetic stripe reader |
| IOMB | I | Selects the use of the RAM/ROM memory or peripheral equipment |
| RDB | I | Activates data bus AD0-AD7 to read |
| WRB | I | Activates data bus AD0-AD7 to write |
| SLIP | I | Indicates printer is ready, e.g. paper available |
| BUSY | I | Indicates printer is in use |
| DOCP | I | Indicates card or passbook is in magnetic stripe reader |
| PLEDB | O | Provides clock signal to latch bit pattern on AD bus into pin pad keyboard |
| MLEDB | O | Energizes the light emitting diode (LED) on magnetic stripe reader to indicate availability |
| PBSB | O | Selects card or passbook stripe formats |
| SRQ1B | I | Interrupt signal to terminal indicating service request for magnetic stripe reader |
| SRQ2B | I | Interrupt signal to terminal indicating service request for printer |
| JSDO | O | Serial data line for printer |
| JWRSB | O | Strobe indicating end of each 8 bit word to printer |
| BCPO | O | Clock pulse synchronized with data bits to indicate validity |
| ROMB | O | Activates ROM |
| RAMB | O | Activates RAM |

Though the operational logic for interfacing Financial Terminal 2 (FIG. 1) to Printer 4, Magnetic Stripe Reader 5, Keyboard 7, RAM 9, ROM 11 and Latch 12 can be discerned by one practicing in the art upon an analysis of the schematics in the ensuing drawings, logic Tables II-VIII are provided to summarize the relationships and ease the understanding of the numerous and often related functions being performed. In the tables, the symbol "X" represents a "don't care" condition.

The RAM and ROM selection logic is considered first. Table II presents the combination of input signals used to generate output signals RAMB and ROMB, respectively enabling RAM section 9 (FIG. 1) and ROM section 11.

TABLE II

| Inputs | | | | | | | | Outputs | |
|---|---|---|---|---|---|---|---|---|---|
| HLDA | IOMB | A15 | A14 | A13 | A12 | A11 | A10 | RAMB | ROMB |
| 0 | 0 | 1 | 0 | 0 | 0 | X | X | 0 | 1 |
| 0 | 0 | 1 | 1 | 1 | 1 | 1 | 1 | 1 | 0 |
| 0 | 0 | 0 | X | X | X | X | X | 0 | 0 |

The determination of which key is depressed on Pin Pad Keyboard 7 (FIG. 1) follows a sequence established in Financial Terminal 2, during which a group of coded binary data patterns are entered into Latch 12 and applied to Pin Pad Keyboard 7. The output of the keyboard is monitored by Financial Terminal 2. Since the structure of Pin Pad Keyboard 7 is mechanically fabricated to generate an output only when the code in the data pattern and the depressed key correspond, a single output line, coupled directly to Financial Terminal 2, is suitable to convey the match signal. The detailed circuit arrangements are relatively well known by those practicing in the art.

The signal on PLEDB sequentially latches the group of coded data patterns into Latch 12 (FIG. 1) as they are generated by Financial Terminal 2. The logic defining the signal on line PLEDB is presented in Table III. In particular, note that a demultiplexing command signal must appear on line ALE before the coded data from Financial Terminal 2 is coupled to AD Bus 25 (FIG. 2).

TABLE III

| Inputs | | | | | | | | | | | Output |
|---|---|---|---|---|---|---|---|---|---|---|---|
| AD7 | AD6 | AD5 | AD4 | AD3 | AD2 | AD1 | AD0 | ALE | WRB | RDB | PLEDB |
| 1 | 0 | 0 | 0 | 0 | 1 | 1 | 0 | 1 | 1 | 1 | 1 |
| 0 | 0 | 0 | 0 | 0 | 0 | 0 | 0 | 0 | 0 | 1 | 0 |

The logic for establishing the magnetic stripe format generates a signal on line PBSB to Magnetic Stripe Reader 5 (FIG. 1). The logic conditions are summarized in Table IV. The PBSB signal is used to distinguish whether the data signals are to be generated by a passbook or a credit card. Though both have magnetically encoded stripes which are sensed by Reader 5, the stripes differ in the format utilized for the data. Again, demux command signal ALE is required to enable transmission of data.

TABLE IV

| Inputs | | | | | | | | | | | | | Output |
|---|---|---|---|---|---|---|---|---|---|---|---|---|---|
| IOMB | HLDA | AD7 | AD6 | AD5 | AD4 | AD3 | AD2 | AD1 | AD0 | ALE | WRB | RDB | PBSB |
| 1 | 0 | 1 | 0 | 0 | 0 | 0 | 0 | 1 | 0 | 1 | 1 | 1 | 1 |
| 1 | 0 | 0 | 0 | 0 | 0 | 0 | 0 | 0 | 1 | 0 | 0 | 1 | 0 |
| 1 | 0 | 0 | 0 | 0 | 0 | 0 | 0 | 0 | 0 | 0 | 0 | 1 | 1 |

The enablement of the light-emitting diode (LED 15) by a signal on line MLEDB to Magnetic Stripe Reader 5 (FIG. 1) is defined by Logic Table V. As was true for the previous two tables, the appropriate ALE signal must exist.

TABLE V

| Inputs | | | | | | | | | | | | | Output |
|---|---|---|---|---|---|---|---|---|---|---|---|---|---|
| IOMB | HLDA | AD7 | AD6 | AD5 | AD4 | AD3 | AD2 | AD1 | AD0 | ALE | WRB | RDB | MLEDB |
| 1 | 0 | 1 | 0 | 0 | 0 | 0 | 0 | 0 | 0 | 1 | 1 | 1 | 1 |
| 1 | 0 | 0 | 0 | 0 | 0 | 0 | 0 | 0 | 0 | 1 | 0 | 0 | 1 | 0 |
| 1 | 0 | 0 | 0 | 0 | 0 | 0 | 0 | 0 | 0 | 0 | 1 | 1 | 1 |
| 1 | 0 | 1 | 0 | 0 | 0 | 0 | 0 | 0 | 0 | 1 | 1 | 0 | 1 |

The operation of Magnetic Stripe Reader 5 (FIG. 1) is initiated when a document present, DOCP, signal is generated. Table VI defines the logic conditions to generate a signal on line DOCP, a signal indicating the physical presence of a document in the slot of Magnetic Stripe Reader 5.

TABLE VI

| Inputs | | | | | | | | | | | Output |
|---|---|---|---|---|---|---|---|---|---|---|---|
| ALE | AD7 | AD6 | AD5 | AD4 | AD3 | AD2 | AD1 | AD0 | WRB | RDB | DOCP |
| 1 | 1 | 0 | 0 | 0 | 0 | 0 | 0 | 1 | 1 | 1 | 1 |
| 0 | X | X | X | X | X | X | X | 0 | 1 | 0 | 0 |
| 0 | X | X | X | X | X | X | X | 1 | 1 | 0 | 1 |

Data representing the state and availability of Dot Matrix Printer 4 (FIG. 1) are coupled to Financial Terminal 2 on AD Bus 25 (FIG. 2), lines AD0 and AD1, as defined by Table VII.

TABLE VII

| Inputs | | | | | Outputs |
|---|---|---|---|---|---|
| IOMB | SLIP | BUSY | RDB | AD0 | AD1 |
| 1 | 0 | 0 | 0 | 0 | 0 |
| 1 | 1 | 0 | 0 | 0 | 1 |
| 1 | 0 | 1 | 0 | 1 | 0 |
| 1 | 1 | 1 | 0 | 1 | 1 |

The generation of a service request signal from Dot Matrix Printer 4 (FIG. 1) to Financial Terminal 2 is prescribed according to the logic in Table VIII.

TABLE VIII

| Inputs | | | | | | | | | | | | Output |
|---|---|---|---|---|---|---|---|---|---|---|---|---|
| AD7 | AD6 | AD5 | AD4 | AD3 | AD2 | AD1 | AD0 | ALE | BUSY | WRB | RDB | SRQ2B |
| 1 | 0 | 0 | 0 | 0 | 1 | 0 | 1 | 1 | X | 1 | 1 | 1 |
| 0 | 0 | 0 | 0 | 0 | 0 | 0 | 1 | 0 | 1 | 0 | 1 | 0 |
| 0 | 0 | 0 | 0 | 0 | 0 | 0 | 1 | 0 | 0 | 1 | 1 | 1 |
| 1 | 0 | 0 | 0 | 0 | 1 | 0 | 0 | 1 | 1 | 0 | 1 | 1 |

With the interface logic generally defined, attention will now focus on the operation of the functional blocks depicted in FIG. 2 to electrically create the prescribed control signals. Recall that the functional blocks in FIG. 2 represent only the section of Interface Controller 3 entitled Interface Circuit 8. The remaining sections, entitled RAM 9 (FIG. 1), ROM 11 and Latch 12, represent relatively routine arrangements of conventional devices. Also, note the correspondence of the reference symbols used with the lines in FIG. 2, in Table I, and in the ensuing figures of the drawings.

Attention is now again directed to FIG. 2. As shown by the blocks, RAM 9 (FIG. 1) or ROM 11 are enabled by Memory Select Logic block 14, using respective lines RAMB and ROMB, when the appropriate binary patterns are applied to lines A10–A15, IOMB, and HLDA. Control Logic block 16 performs numerous preliminary logic operations which relate to the proper operation of blocks 14, 17, 18, 21, 22, 24 and 34. Consequently, the contributions of block 16 will be considered at the time the affected blocks are described.

Pin Pad Clock block 17 generates an output signal on the PLEDB line. This signal is used to synchronously latch a coded binary pattern into Latch 12 (FIG. 1) for transmission on AD Bus 25 to Pin Pad Keyboard 7.

Latch And Decode block 18 in FIG. 2 generates a series of internal clock signals to synchronize the transmission of signals on AD Bus 25 within Interface Circuit 8.

Reader And Printer Logic block 19 senses the various status conditions for Dot Matrix Printer 4 (FIG. 1) and Mag Stripe Reader 5.

Figure 4:
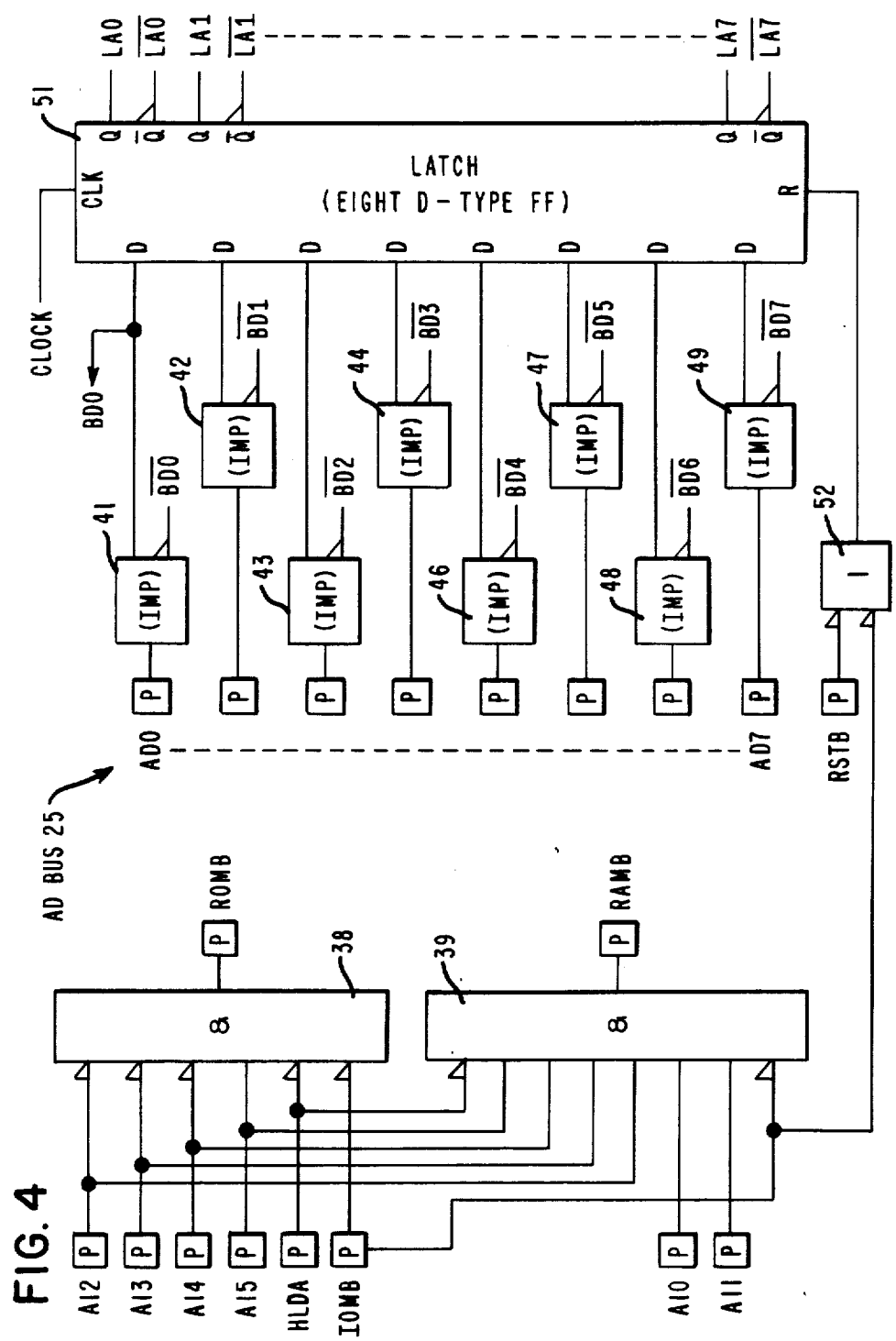

Passbook Logic block 21 and Mag Stripe LED Logic block 22 in FIG. 4 interact with Mag Stripe Reader 5. Block 21 is used to select the magnetic format, prescribing either a credit card format or a passbook stripe format. Block 22 contains logic to signal the availability of Mag Stripe Reader 5. The outputs of logic blocks 21 and 22, lines PBSB and MLEDB respectively, are determined by the input signals on AD Bus 25, as prescribed previously in Tables IV and V.

Printer Service Request Logic block 24, Printer Data Bit Synch block 29, and Printer Word Strobe block 31 in FIG. 2 generate control signals which relate to the operation of Dot Matrix Printer 4 (FIG. 1). Block 24 generates a signal to indicate the availability of Printer 4, while block 29 generates validation pulses in synchronism with the data. The strobe pulses generated by block 31 signal the end of each 8 bit serial word transmitted from Serial Shift Register block 32 to Printer 4 on line JSDO.

Mag Stripe Service Request Logic block 34 in FIG. 2 generates a signal to indicate the availability of Mag Stripe Reader 5 (FIG. 1). Address/Data Bus Buffer block 23 represents a group of bidirectional, tristate devices used to buffer incoming and outgoing signals on lines AD0–AD7 of AD Bus 25. The eight lines of parallel data on AD Bus 25 are converted to serial format for Printer 4 (FIG. 1) using Parallel Register 26 and Serial Shift Register 32. Serial data generated in Mag Stripe Reader 5 (FIG. 1) is coupled back into AD Bus 25 from line MSRD, by way of Shift Register block 36, Parallel Register block 37, and Address/Data Bus Buffer 23.

The master clock signal on line CLK is divided down in frequency to convert data signals between serial and parallel formats. The division is performed by counter blocks 27, 28 and 33. The novel features which characterize the structural organizations of the embodying counters will be described in significant detail hereinafter.

With a functional understanding of Interface Circuit 8 at hand, attention will now be directed to the relationships between Interface Circuit 8 and RAM 9, ROM 11 and Latch 12 (FIGS. 1 and 2). ROM 11 expands and modifies the firmware in Financial Terminal 2 to operate the terminal with one or more pieces of peripheral equipment, e.g. Dot Matrix Printer 4. RAM 9 provides the additional data storage capacity required in the terminal to retain data from Magnetic Stripe Reader 5 when Financial Terminal 2 is occupied with other operations. Therefore, RAM 9 and ROM 11 of Interface Controller 3 are coupled directly into Financial Terminal 2, with Interface Circuit 8 merely serving to energize the appropriate memory when Financial Terminal 2 generates the appropriate bit code on address lines Al0-A15 (FIG. 2).

As was briefly described hereinbefore, Latch 12 is coupled to AD Bus 25 to retain sets of coded data generated by Financial Terminal 2. Each set of coded data is subsequently coupled to Pin Pad Keyboard 7 (FIG. 1) in the process of matching the coded data with the depressed keys. The output from Keyboard 7 is coupled directly back into Financial Terminal 2 using a line from AD Bus 25.

FIG. 3 of the drawings provides a legend showing the correspondence between the contemporary designation of logic blocks utilized herein and the formerly followed convention. The remaining blocks, flip-flops, latches and registers, follow a self-evident marking convention. The blocks marked with the symbols "(INP)" and "(OUT)" are the opposite halves of tristate buffers. The letter "P" within a small square at the termination of a line represents an input or output pin, and corresponds by line symbol to the input and output lines depicted in FIG. 2.

The detailed analysis of the preferred embodiment structure begins with FIG. 4 of the drawings. Logic AND gates 38 and 39 receive binary patterns of data on lines A10-A15 and generate signals on lines RAMB and ROMB to selectively enable RAM block 9 (FIG. 1) and ROM block 11, respectively. Lines HLDA and IOMB also couple signals from Financial Terminal 2 (FIG. 1) into gates 38 and 39. A signal on either line, HLDA or IOMB, disables Interface Controller 3, while the absence of a signal, i.e. a binary "0", enables the selection of RAM 9 or ROM 11 according to the binary logic in Table II.

Lines AD0-AD7 of AD Bus 25 are connected through tristate input amplifiers 41, 42, 43, 44, 46, 47, 48 and 49 to latch 51. These amplifiers permit bidirectional operation of AD Bus 25, and further serve to interface the voltage levels on the AD Bus, typically TTL signals, with the MOS levels internal to Interface Circuit 8 (FIG. 1). The CLOCK line attached to latch 51 causes the data on AD Bus 25 to be latched, separating the address signals, which appear during the first sequence, from the data signals, which appear during the successive sequence. Latch 51 is reset by gate 52 when either line IOMB or RSTB receives a binary "1" level signal.

Logic AND gates 53, 54, 56, 57, 58 and 59 in FIG. 5 decode the AD Bus signals held in latch 51 (FIG. 4). Note that outputs from the logic gates, on lines CS0-CS6, represent a combination of AD Bus data joined with signal CSE, which signal is itself generated by AND gate 67 from a combination of signals originating on bus lines AD3-AD7 with HLDA and IOMB. According to the logic conditions imposed by gate 67, the generation of a signal on line CSE requires the absence of signals on HLDA and LA3-LA7 together with the presence of signals on IOMB and LA7.

FIG. 5 shows that the signal on the CLOCK line, used to operate latch 51 (FIG. 4), is generated in logic gate 66 when signals on lines IOMB and ALE appear concurrently. Reference to Table I indicates that ALE carries a demultiplexing signal for AD Bus 25 (FIG. 2) and is used, as noted hereinbefore, to separate the sequence of signals according to whether they represent address information o data information.

The series connected logic gates 54 and 61 are combined with FFs 62 and 63 to generate signals which enable Mag Stripe Reader 5 (FIG. 1), to synchronize its operation and to couple its data onto AD Bus 25. It should be recognized that Mag Stripe Reader 5 generates serial data whose time sequence varies according to the rate at which Card 6 (FIG. 1) is moved through Reader 5. During the operation of Mag Stripe Reader 5 a signal on line $\overline{CSI}$ indicates the selection of the mag stripe reader from among the peripheral equipment, and a concurrent signal from Financial Terminal 2 (FIG. 1) on line WRB activates AD Bus 25 to transmit data to the financial terminal. Gate 61 generates the clocking signal for FF 62. When clocked, FF 62 enters the data on line BDO from Financial Terminal 2 (FIG. 1) and generates opposite signals on output lines B1DO and BB2RST. The signal on line B1DO actually enables Mag Stripe Reader 5. The signal on BB2RST is used to reset the serial-to-parallel converter depicted in FIG. 7, which converter effectively groups serially generated mag stripe reader data into eight bit sets for AD Bus 25. FF 63 detects the enablement of the mag stripe reader, and generates a signal on line MQ to indicate the actual movement of a magnetically coded card or passbook through Reader 5 when the first bit sequence is detected by the presence of a signal on Q6.

The mag stripe reader generated clock signal on line RCLB is combined with the power supply voltage $V_{DD}$ in logic AND gate 68 to generate the clock signals for converting mag stripe reader data from serial to parallel format. The conversion is performed by a segment of the circuit shown in FIG. 7.

Logic gate 64 in FIG. 5 generates the clock signal to latch the data on AD bus 25 (FIG. 2) into externally located Latch 12 (FIG. 1) in preparation for a write action using Pin Pad Keyboard 7.

The circuit composition of the modulo 8 counter is depicted in FIG. 6. Functionally, it performs the divide-by-eight operation shown in block 33 of FIG. 2. The counter generates an output signal on line Q6 for every eight clock pulses appearing on line B1RCLDO, the signal generated in Mag Stripe Reader 5. The analysis of the novel implementation by which D-type FFs, 69, 71, 72 and 73, are combined with logic gates, 74, 76 and 77, in a feedback loop arrangement, will be deferred until the analogous modulo 12 and modulo 16 counter circuits are considered in detail.

Figure 7:
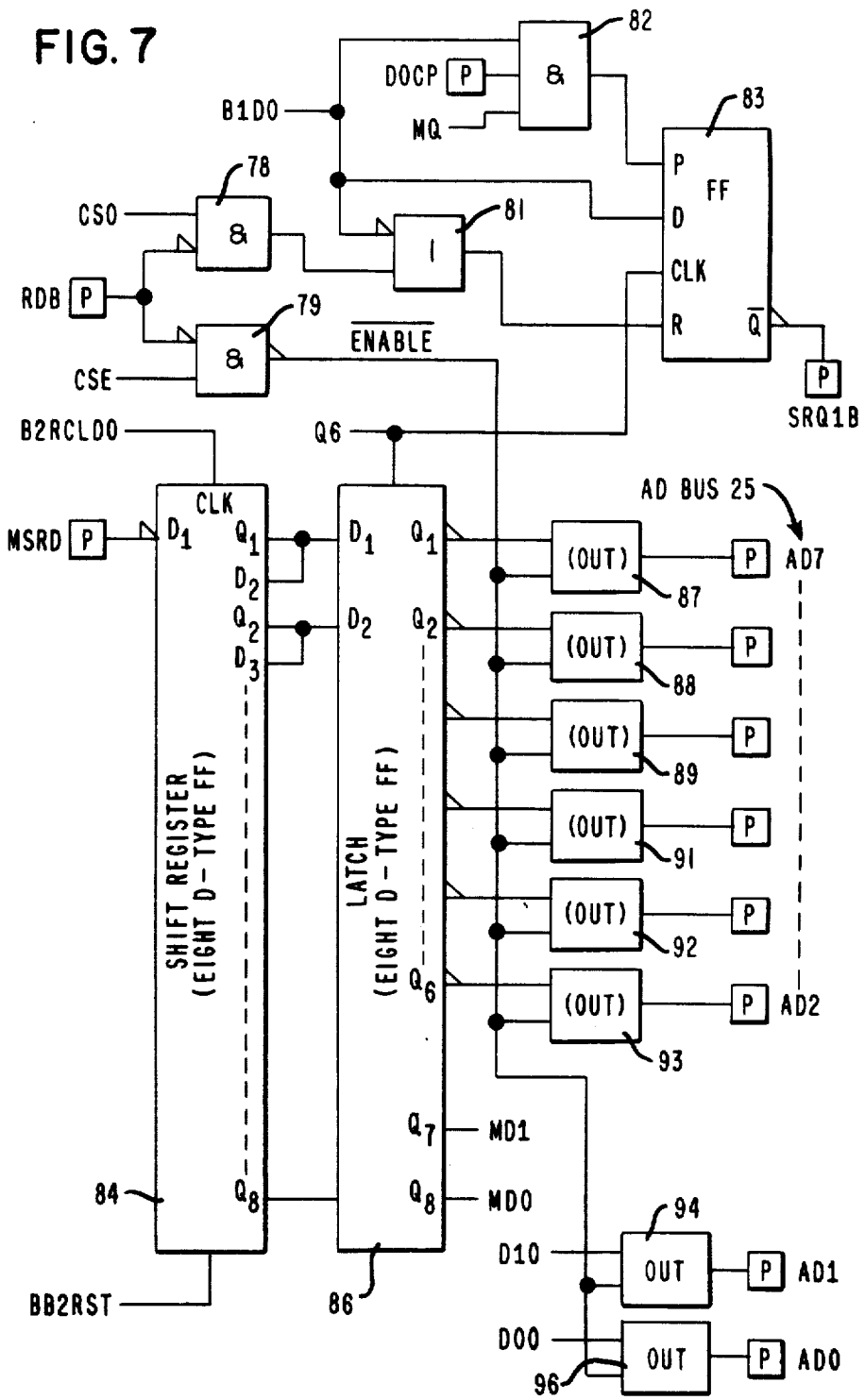

Now consider the circuit in FIG. 7. The combination of gates 78, 81 and 82, together with FF 83, generates a service request signal on line SRQIB. The service request signal is coupled to Financial Terminal 2 (FIG. 1)

to indicate that mag stripe reader data is available on AD Bus 25 (FIG. 2). The functions of the signals on lines RDB, DOCP and SRQ1B are described in Table I. The origins of signals on lines CS0, B1D0 and MQ were described previously with reference to FIG. 5.

The serial data generated by Mag Stripe Reader 5 (FIG. 1) appears on line MSRD in FIG. 7 and is converted by the combined action of shift register 84 and latch 86 to parallel format. The conversion is performed by having the serial data on line MSRD shifted synchronously into register 84 by the card-generated clock signals appearing on line B2RCLDO. The signal on line Q6, generated by the modulo 8 counter in FIG. 6, latches eight bit groups of data into latch 86. Thereafter, tristate output amps 87, 88, 89, 91, 92, 93, 94 and 96 are enabled by signals on lines RDB and CSE to write the latched data onto AD Bus 25.

Figure 8:
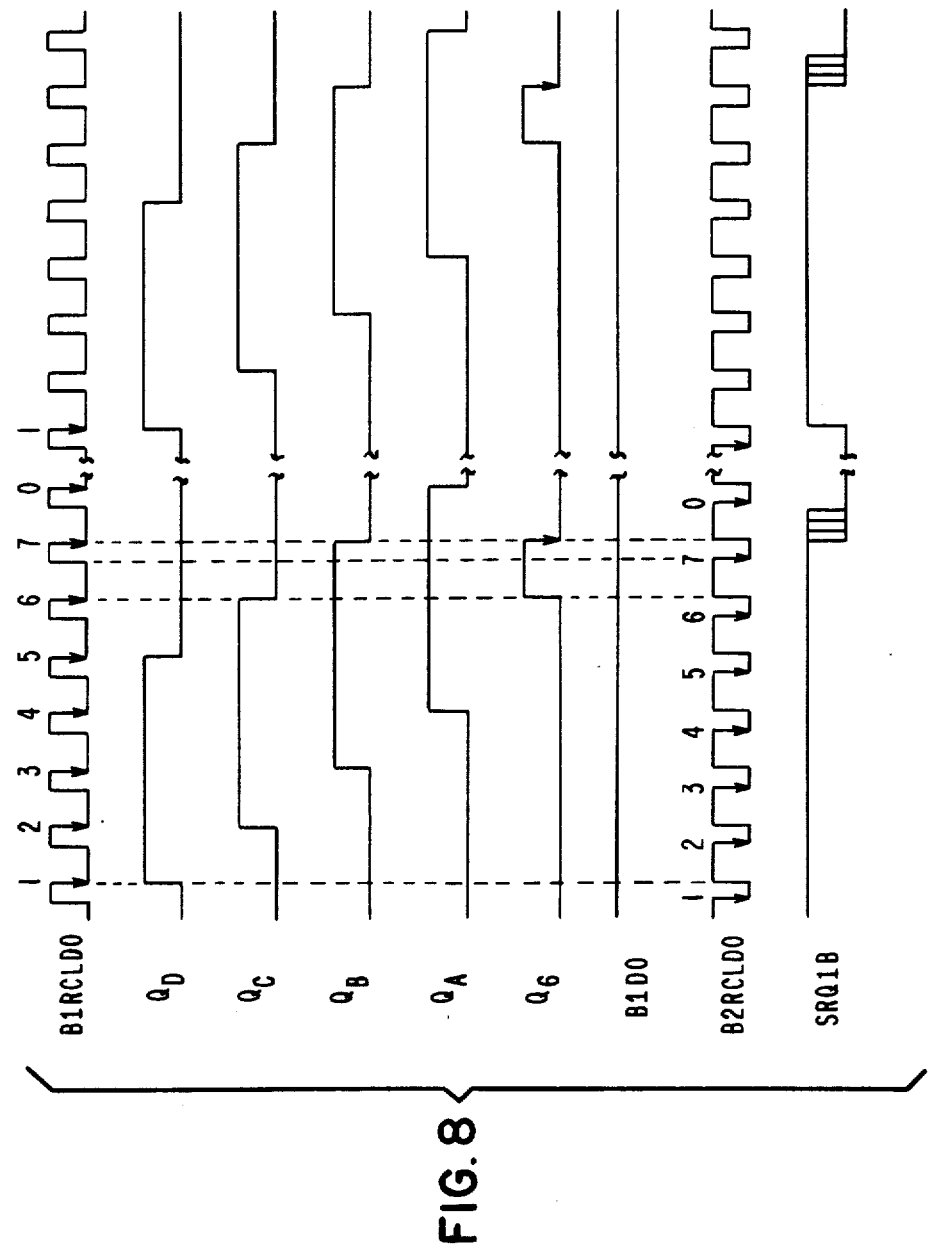
FIGS. 8 and 12 contain timing diagrams for various signals in the interface controller.

FIG. 8 contains a timing diagram showing the wave shapes and sequencing of signals on selected lines from FIGS. 5, 6 and 7. Progressing in time sequence from the left of FIG. 8, the first event is the clock "1" transition on line B2RCLDO. Coincident with each successive falling edge of B2RCLDO, mag stripe reader data on line MSRD is shifted into register 84 (FIG. 7). The clock "1" falling edge of B1RCLDO enables and commences the counting by the modulo 8 counter depicted in FIG. 6. The falling edge of $Q_6$ coincides with the falling edge of B1RCLDO at clock "7," to latch the data from register 84 (FIG. 7) in the course of converting it from serial to parallel format. Thereafter, SRQ1B indicates the availability of converted data on the AD Bus 25 (FIG. 2).

In the overview of FIG. 7, note that the entry of data into shift register 84, corresponding to the clocking of B2RCLDO, always precedes the serial-to-parallel converter timing signals on B1RCLDO. Also note that B1D0 is enabled throughout the time interval being considered.

Figure 9:
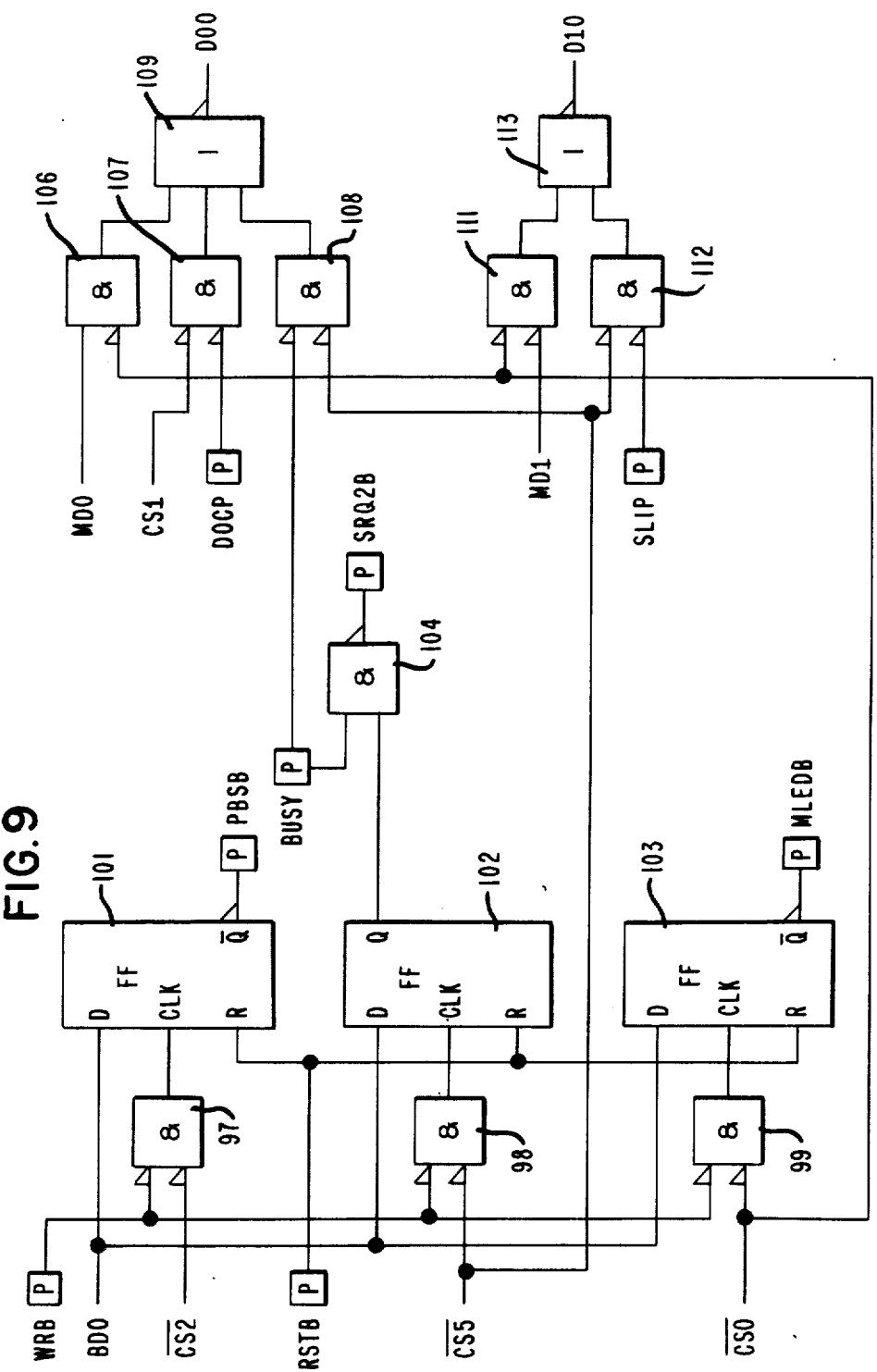

The circuit blocks appearing in FIG. 9 perform other sequencing control functions used during the operation of Dot Matrix Printer 4 (FIG. 1) and Mag Stripe Reader 5. Gate 97 and FF101 combine a signal on line $\overline{CS2}$, representing data received from Financial Terminal 2 (FIG. 1), with a signal on line WRB, defined in Table I, to clock in the data signal appearing on line BD0 and generate an output signal on line PBSB. The PBSB signal is used by firmware within Financial Terminal 2 to determine whether the magnetic stripe data is in credit card or passbook format.

Gate 98, FF102 and gate 104 combine signals on lines $\overline{CS5}$, WRB and BUSY to generate a printer service request signal on line SRQ2B, which notifies Financial Terminal 2 accordingly. Gate 99 is used in conjunction with FF103 to generate a signal energizing LED 15 (FIG. 1) on Mag Stripe Reader 5, as a means of indicating the reader's availability.

The data representations on lines MD0, DOCP, BUSY, MD1 and SLIP are multiplexed onto two lines, D0O and D1O, for coupling to AD Bus 25 and eventually into Financial Terminal 2 (FIG. 1). The state of the multiplexer is established by a logic combination of signals generated in Financial Terminal 2 according to the arrangement of logic gates 106, 107, 108, 109, 111, 112 and 113. Lines MD0 and MD1 originate at latch 86 in FIG. 7. The DOCP, BUSY and SLIP lines present signals indicating conditions as defined in Table I.

Figure 10:
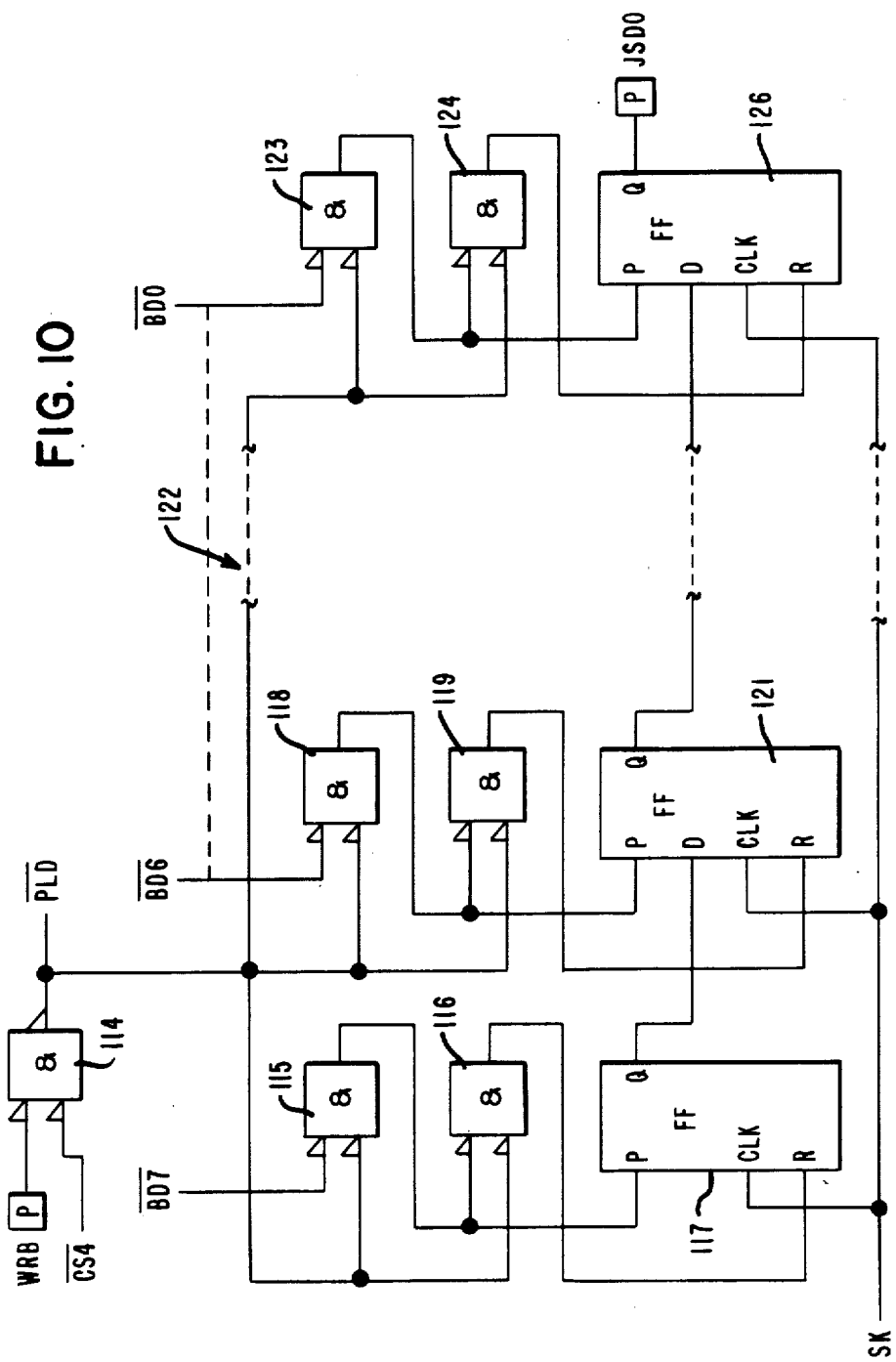

The circuit in FIG. 10 illustrates an embodiment of the logic by which data directed to Dot Matrix Printer 4 (FIG. 1) is converted from the parallel format of AD Bus 25 (FIG. 2) to the serial format required by Printer 4. Line JSDO conveys the output signals to the printer. Gate 114 generates a signal on line $\overline{PLD}$ when the bus is in the write mode and the printer is selected. Data on AD Bus 25 (FIG. 2) are coupled on lines $\overline{BD0}$–$\overline{BD7}$ to the preset inputs of a group of D-type FFs connected to operate as a shift register. For instance, data on line $\overline{BD7}$ is logically combined in gate 115, then connected to the preset input "P" of FF117. FF117 is reset by the output of logic gate 116. Note also that the "Q" outputs of shift register FFs serves as the "D" inputs to successive FFs in the register. For instance, FF121 is preset according to gate 118, reset according to gate 119, and receives its "D" input signal from the "Q" output of FF117. The structural arrangement of the circuit is repeated in area 122 for $\overline{BD5}$, $\overline{BD4}$, $\overline{BD3}$, $\overline{BD2}$ and $\overline{BD1}$, finishing with gates 123 and 124 for generating a JSDO line output from FF126. The shift register arrangement in FIG. 10 is clocked by a signal on line SK.

Figure 11:
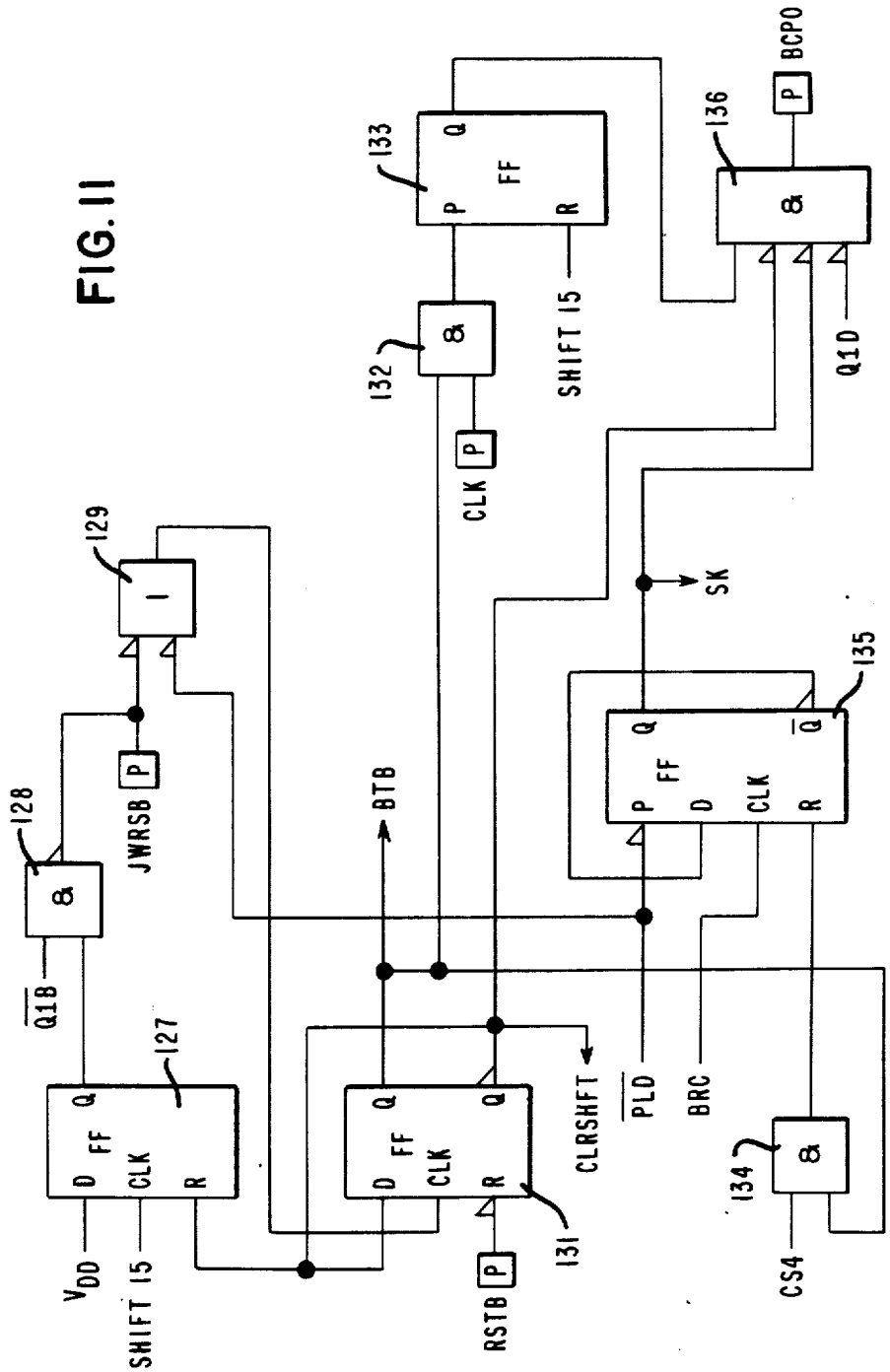
Figure 12:
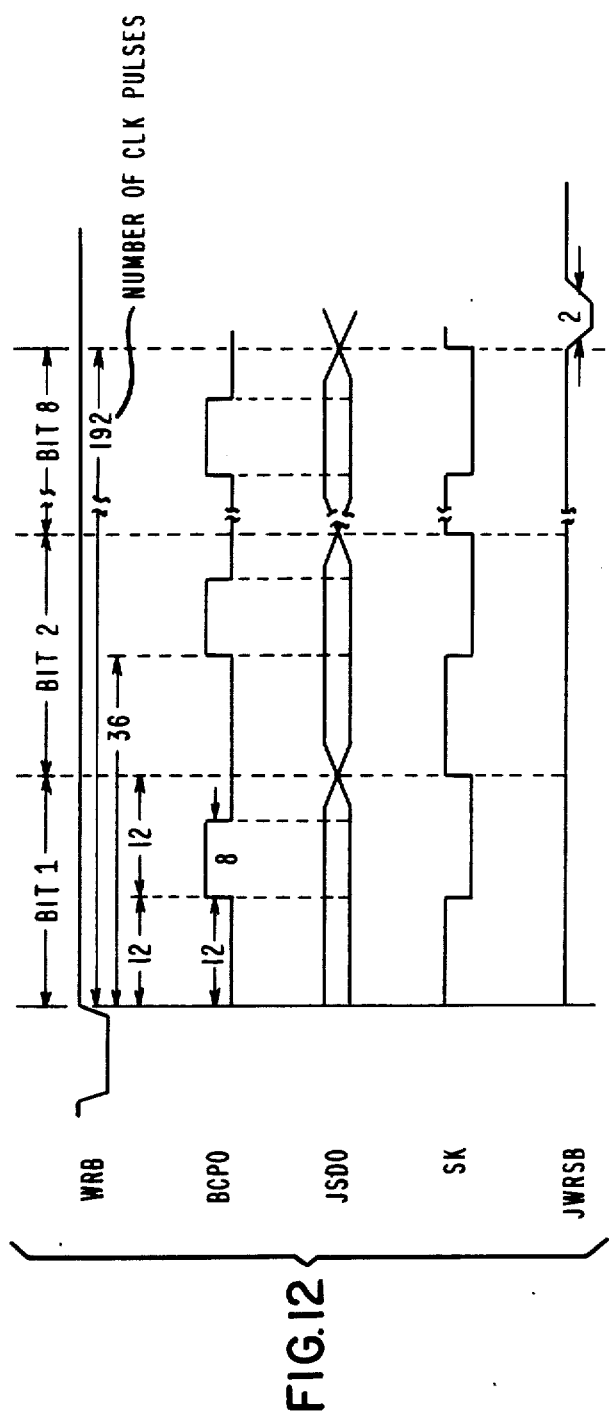

The circuitry shown in FIG. 11 controls the transmission of data to Dot Matrix Printer 4 (FIG. 1) by establishing the timing and data format. FIG. 12 presents the timing diagram illustrating an exemplary pattern of signals generated by the circuit in FIG. 11. Consequently, the two figures should be considered together in developing an understanding of interface between Financial Terminal 2 (FIG. 1) and Dot Matrix Printer 4. Again, reference is made to Table I for a definition of the functional contributions of the signals on lines WRB, BCPO, JSDO and JWRSB.

The transmission signals to Dot Matrix Printer 4 (FIG. 1) begins with a change in the signal on $\overline{PLD}$, which signal is the result of a logic combination involving signals WRB and $\overline{CS4}$ in gate 114 (FIG. 10). Gate 232, FF133 and gate 136 operate in combination with gates 134 and 135 to generate the validation signal, BCPO, during the appropriate segment of each bit sequence. FF135 also generates the SK signal to establish a bit transmission rate corresponding to one twentyfourth the CLK rate. FF127, FF131, gate 128 and gate 129 detect the completion of each serial eight bit word sequence.

In operation, the transmission of data to Printer 4 commences with the concurrent presence of a signal on line WRB, and continues thereafter until a strobe signal is received on line JWRSB. Note that each group of eight data bits is actually comprised of 192 CLK pulses divided into 16 segments of 12 pulses each. The 12 pulse segments are paired for each SK signal. A validation signal on BCPO is generated for each bit, SK cycle, during the interval between CLK pulses 12 and 20. At the conclusion of the 192 CLK pulses, all $\overline{BD0}$–$\overline{BD7}$ data, originating in parallel format, has been shifted out to Printer 4 in serial format.

The unique timing of the validation signal BCPO within each cycle of the SK signal substantially suppresses leading and trailing edge disturbances which would otherwise provide erroneous bit data to the printer.

Figure 14:
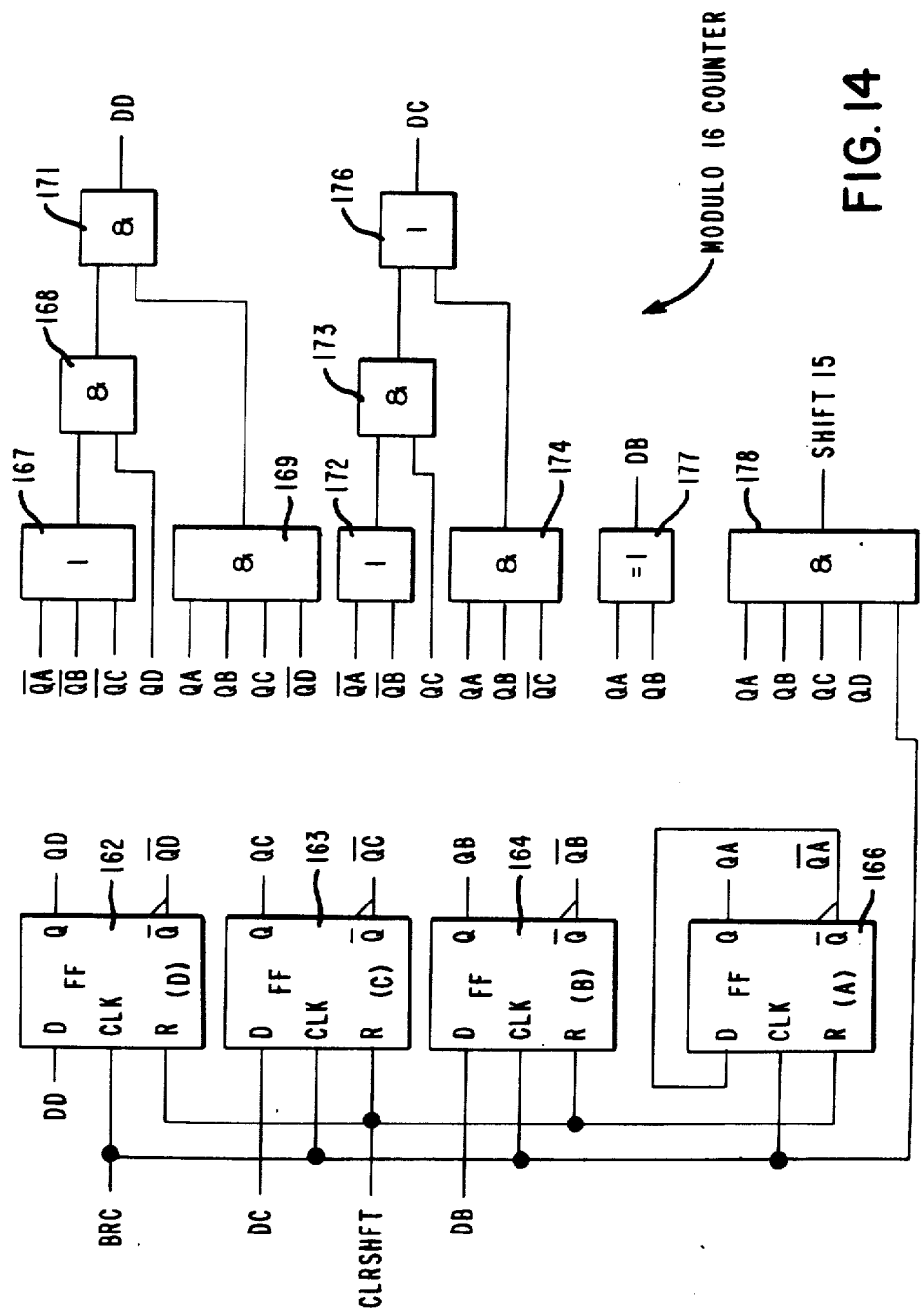

With an understanding of the operations performed by Interface Controller 3 (FIG. 1) at hand, the ensuing development will focus on the unique implementation of D-type FFs to create modulo X counters of the type illustrated in FIGS. 6, 13 and 14. Note that X is numerically defined by the inequality $2^{n-1} < X \leq 2^n$, where n is the number of FF stages. Initially, the modulo 8 counter in FIG. 6 will be described with relation to the classic Johnson counter. Thereafter, the modulo 12 counter in FIG. 13 will be developed and the design description then extended to the modulo 16 counter in FIG. 14. In terms of the function shown in FIG. 2, the counters perform the division operations attributed to blocks 27, 28 and 33.

It is no doubt clear from the foregoing structural arrangements and operations that synchronism of the data and control signals is crucial to the proper operation of the composite system. Inherently, this requires that any frequency dividers utilized within Interface Controller 3 (FIG. 1) not introduce significant skewing of signals between successive counter stages or exhibit spurious intermediate count signals in the course of accumulating count patterns. For these and other reasons, conventional ripple type counters configured with J-K type FFs are inherently unsatisfactory for the synchronous form of operation presently sought. Though compensating circuits are available, the additional complexity is clearly not preferred. Furthermore, such compensating circuits often complicate the synchronous starting requirement or increase the likelihood of a race condition in the asynchronous feedback logic utilized.

To satisfy these ends, the present invention provides a modulo 8 counter according to structure depicted in FIG. 6 and operational sequence defined by the binary data pattern presented in Table IX. The clocking signal on line B1RCLD0 is generated by Mag Stripe Reader 5 (FIG. 1) and is coupled to Interface Circuit 8 on line RCLB (FIG. 5).

TABLE IX

| Decimal Number | Binary Output At "Q" Before Time CLK, By FF | | | | Binary Output At "Q" After Time CLK, By FF | | | | $Q_6$ After CLK |
|---|---|---|---|---|---|---|---|---|---|
| | D | C | B | A | D | C | B | A | |
| 0 | 0 | 0 | 0 | 1 | 0 | 0 | 0 | 0 | 0 |
| 1 | 0 | 0 | 0 | 0 | 1 | 0 | 0 | 0 | 0 |
| 2 | 1 | 0 | 0 | 0 | 1 | 1 | 0 | 0 | 0 |
| 3 | 1 | 1 | 0 | 0 | 1 | 1 | 1 | 0 | 0 |
| 4 | 1 | 1 | 1 | 0 | 1 | 1 | 1 | 1 | 0 |
| 5 | 1 | 1 | 1 | 1 | 0 | 1 | 1 | 1 | 0 |
| 6 | 0 | 1 | 1 | 1 | 0 | 0 | 1 | 1 | 1 |
| 7 | 0 | 0 | 1 | 1 | 0 | 0 | 0 | 1 | 0 |

The modulo 8 counter illustrated in FIG. 6 is structurally similar to the classic Johnson counter. However, the present arrangement not only maintains the clock-synchronized entry of data, at the D inputs of all FF stages, but provides multiple, logically controlled feedback loops to generate modulos in numerical values other than steps of $2^n$. The binary sequence in Table IX shows that the embodying modulo 8 counter shifts through a sequence of eight unique states and generates an output signal on line $Q_6$ from gate 77 with each decimal count of 6. Gates 74 and 76 provide steering logic in feedback loops for D-type FFs 69, 71, 72 and 73.

The modulo 12 and 16 counters shown in respective FIGS. 13 and 14 further illustrate the use of D-type FFs to create synchronous counters of differing modulos.

Consider the modulo 12 counter in FIG. 13 first. Note that the modulo 12 counter includes four FF stages, devices 138, 139, 141 and 142, clocked by inverting amplifier 137. The counter is enabled by way of the signal on line BTB, which is coupled into gates 156, 157, 158 and 159 of the feedback loop. As embodied, the output from the modulo 12 counter is further synchronized in gate 161 with the clock signal on line CLK to generate the output signal on line BRC.

The structure in FIG. 13 illustrates a further advantage over the classic Johnson counter. Whereas the Johnson counter is limited to a count of 2n, for n FFs, the present configuration, with only four D-type FFs, is capable of counting to 12.

TABLE X

| Decimal Number | Binary Output At "Q" Before Time CLK, By FF | | | | Binary Output At "Q" After Time CLK, By FF | | | | $Q_6$ After CLK |
|---|---|---|---|---|---|---|---|---|---|
| | D | C | B | A | D | C | B | A | |
| 0 | 1 | 0 | 1 | 1 | 0 | 0 | 0 | 0 | 0 |
| 1 | 0 | 0 | 0 | 0 | 0 | 0 | 0 | 1 | 0 |
| 2 | 0 | 0 | 0 | 1 | 0 | 0 | 1 | 0 | 0 |
| 3 | 0 | 0 | 1 | 0 | 0 | 0 | 1 | 1 | 0 |
| 4 | 0 | 0 | 1 | 1 | 0 | 1 | 0 | 0 | 0 |
| 5 | 0 | 1 | 0 | 0 | 0 | 1 | 0 | 1 | 0 |
| 6 | 0 | 1 | 0 | 1 | 0 | 1 | 1 | 0 | 0 |
| 7 | 0 | 1 | 1 | 0 | 0 | 1 | 1 | 1 | 0 |
| 8 | 0 | 1 | 1 | 1 | 1 | 0 | 0 | 0 | 0 |
| 9 | 1 | 0 | 0 | 0 | 1 | 0 | 0 | 1 | 0 |
| 10 | 1 | 0 | 0 | 1 | 1 | 0 | 1 | 0 | 0 |
| 11 | 1 | 0 | 1 | 0 | 1 | 0 | 1 | 1 | 1 |

Table X provides a tabulation of the binary states and equivalent decimal counts as the FFs are incremented through the modulo 12 cycle. The feedback signals that generate the sequence of binary states are created in the logic blocks at the right in FIG. 13. For instance, the signal on D1A is generated by logic gate 156. The signal on line D1B is defined by Exclusive OR gate 154 and logic gate 157.

The logic necessary to generate D1C is more complex. Considering Table X and FIG. 13 together, note that gate 152 generates a binary "1" state with decimal number 3, which state then remains by action of Q1C on gate 151 until both Q1A and Q1B become binary "1." Then, the output of gate 149 changes to binary "0". With this logic organization, gates 153 and 159 remain at binary "1" for the decimal numbers 3–6.

The signal on line D1D is generated using a similar combination of logic gates. Namely, the binary "1" output condition is first generated by gate 147, then held by the Q1D input to gate 146 until disabled by gate 144. Together, gates 146, 147 and 148 generate a binary "1" for the group of decimal numbers 7–10.

The modulo 16 counter depicted in FIG. 14 utilizes an architecture similar to the modulo 12 counter in FIG. 13. FFs 162, 163, 164 and 166 are again D-type FFs whose output states are sequentially modified by the steering logic in the feedback loop. The signal on line CLRSHFT, generated by FF131 in FIG. 11, resets the counter. Gate 178 ensures that the counter output signal on SHIFT 15 is fully synchronized to the clocking signal on BRC.

The organization of the feedback logic for the modulo 16 counter is clearly depicted in FIG. 14. For FF 166, the inverse output $\overline{QA}$ is coupled directly back into the "D" input. The input of FF164 is defined by the output Exclusive OR gate 177. Gates 172, 173, 174 and 176 together define the input to FF 163, while gates 167, 168, 169 and 171 do likewise for FF 162.

It is no doubt apparent to one skilled in the art that the above-described embodiment illustrates merely one of many potential arrangements by which the invention may be practiced. Consequently, the embodiment and its various features serve only as examples of the full scope and spirit of the invention as now claimed.

I claim:

1. An interface controller, connected between peripheral equipment and a computer terminal, for selectively coupling plural pieces of peripheral equipment to the computer terminal, comprising:
- a bidirectional bus connecting the interface controller to the terminal;
- means for synchronizing the timing of the interface controller with the terminal, connected to the terminal and to elements within the interface controller;
- means responsive to control signals from the terminal for selecting the peripheral equipment to be operated and the operational direction of said bidirectional bus;
- firmware means directly addressable by the terminal for modifying the control signals, which are generated in the terminal and are used to control the means for selecting, to correspond with the peripheral equipment; and
- means for receiving asynchronous serial data from selected asynchronous data generating type peripheral equipment and synchronously coupling the data in a parallel format to the terminal over said bidirectional bus.

2. The apparatus recited in claim 1, further comprising:
- peripheral equipment means for receiving a coded data bit pattern from the terminal connected to said bidirectional bus, transmitting the pattern through peripheral equipment capable of altering the bit pattern, and returning an altered bit pattern to the terminal.

3. The apparatus as recited in claim 2, further comprising:
- means for receiving synchronized parallel data on said bidirectional bus and synchronously coupling the data in an expanded serial format to a peripheral equipment printer.

4. The apparatus recited in claim 3, wherein:
- said firmware means addressable by the terminal for modifying the control signals is an expanded instruction set in a programmed memory addressable by the terminal over said bidirectional bus.

5. The apparatus recited in claim 4, wherein:
- said means for receiving asynchronous serial data from selected asynchronous data generating type peripheral equipment includes a serial shift register, a source of clocking signals generated in said data generating type peripheral equipment in time correspondence with the serial data generated therein, a parallel shift register coupled to said serial shift register, and a frequency divider for receiving said clocking signals generated in said data generating type peripheral equipment and generating output signals to cause the transfer of data between said serial shift register and said parallel shift register.

6. The apparatus recited in claim 5, wherein:
- said means for receiving synchronous parallel data on said bidirectional bus includes a parallel shift register, a source of clocking signals generated in the terminal, frequency dividers coupled to said source of clocking signals, logic circuit means coupled to said source of clocking signals and said frequency dividers for arranging the timing of the frequency dividers to blank the leading and trailing ends of the data after converting data from parallel to serial format, and means for generating a validatiion signal coinciding in time with the data in its serial format.

7. The apparatus recited in claim 6, wherein:
- said frequency dividers are modulo X counting devices, wherein $2^{n-1} < X \leq 2^n$, having n D-type flip-flops, a source of common clocking signals, and feedback logic means for connecting the output terminals of the D-type flip-flops with their D input terminals to generate binary signals at the output terminals having X nonrepetitive binary patterns.

* * * * *